United States Patent
Mashiko et al.

(10) Patent No.: US 12,438,330 B2
(45) Date of Patent: Oct. 7, 2025

(54) OPTICAL DEVICE AND FIBER LASER APPARATUS

(71) Applicant: Fujikura Ltd., Tokyo (JP)

(72) Inventors: Yasuhiro Mashiko, Sakura (JP); Shinichi Sakamoto, Sakura (JP); Sho Namiki, Sakura (JP)

(73) Assignee: Fujikura Ltd., Tokyo (JP)

(*) Notice: Subject to any disclaimer, the term of this patent is extended or adjusted under 35 U.S.C. 154(b) by 741 days.

(21) Appl. No.: 17/792,295

(22) PCT Filed: Feb. 19, 2021

(86) PCT No.: PCT/JP2021/006361
§ 371 (c)(1),
(2) Date: Jul. 12, 2022

(87) PCT Pub. No.: WO2021/210267
PCT Pub. Date: Oct. 21, 2021

(65) Prior Publication Data
US 2023/0344187 A1    Oct. 26, 2023

(30) Foreign Application Priority Data
Apr. 15, 2020    (JP) .................................. 2020-072971

(51) Int. Cl.
*H01S 3/067* (2006.01)
*H01S 3/091* (2006.01)

(52) U.S. Cl.
CPC .......... *H01S 3/06708* (2013.01); *H01S 3/091* (2013.01)

(58) Field of Classification Search
CPC .. H01S 3/06708; H01S 3/091; H01S 3/06729; H01S 3/06733; H01S 3/094007;
(Continued)

(56) References Cited

U.S. PATENT DOCUMENTS 9,325,151 B1 * 4/2016 Fini .................... H01S 3/102
2011/0043898 A1   2/2011 Grunsteidl et al.
(Continued)

FOREIGN PATENT DOCUMENTS

CN        1628241 A    6/2005
CN      103460525 A   12/2013
(Continued)

OTHER PUBLICATIONS

Office Action issued in corresponding Chinese Patent Application No. 202180007453.5, dated Sep. 6, 2024 (6 pages).
International Search Report issued in corresponding International Application No. PCT/JP2021/006361 mailed May 11, 2021 (3 pages).

*Primary Examiner* — Joshua King
(74) *Attorney, Agent, or Firm* — Osha Bergman Watanabe & Burton LLP (57) ABSTRACT

An optical device includes a first fiber including a first reflector, a second fiber including a second reflector, and an amplifying fiber that has a normalized frequency that is greater than or equal to 5.13 and is wound so as not to intersect on one plane. The amplifying fiber includes an outer section wound in a circular manner. The amplifying fiber includes an inner section having first arc portions and wound such that at least two of the first arc portions have a radius of curvature in which a higher-order mode that is higher than an LP11 mode has loss. The amplifying fiber includes a first end connected to the first fiber and disposed on an inside of the amplifying fiber. The amplifying fiber includes a second end connected to the second fiber.

10 Claims, 8 Drawing Sheets

(58) Field of Classification Search
CPC ............ H01S 3/0804; H01S 3/094011; H01S 3/094053; H01S 3/09415; H01S 3/1618; H01S 3/0675; H01S 3/06704
See application file for complete search history.

(56) References Cited

U.S. PATENT DOCUMENTS

| | | |
|---|---|---|
| 2011/0058250 A1 | 3/2011 | Liu et al. |
| 2012/0219026 A1* | 8/2012 | Saracco .................. G02B 6/14 |
| | | 372/21 |
| 2013/0235449 A1* | 9/2013 | Suzuki ................. H01S 3/0405 |
| | | 359/341.1 |
| 2015/0331209 A1* | 11/2015 | Pikulski ............... G02B 6/4272 |
| | | 427/163.2 |
| 2017/0170622 A1 | 6/2017 | Kashiwagi |
| 2018/0205196 A1 | 7/2018 | Headley |

FOREIGN PATENT DOCUMENTS

| | | | |
|---|---|---|---|
| JP | 2007-103751 A | 4/2007 | |
| JP | 2010-177553 A | 8/2010 | |
| JP | 2015090909 A | 5/2015 | |
| JP | 2015-197638 A | 11/2015 | |
| JP | 6113630 B2 * | 4/2017 | |
| JP | 2018-190834 A | 11/2018 | |
| JP | 6550494 B1 | 7/2019 | |
| WO | WO-2013138364 A1 * | 9/2013 | ......... H01S 3/06745 |
| WO | 2014/141766 A1 | 9/2014 | |
| WO | 2018/070412 A1 | 4/2018 | |
| WO | 2018/207615 A1 | 11/2018 | |
| WO | 2020021527 A1 | 1/2020 | |

* cited by examiner

OPTICAL DEVICE AND FIBER LASER APPARATUS

TECHNICAL FIELD

The present invention relates to an optical device and a fiber laser apparatus.

Priority is claimed on Japanese Patent Application No. 2020-072971, filed Apr. 15, 2020, the content of which is incorporated herein by reference.

BACKGROUND

In recent years, fiber laser apparatuses have been attracting attention in various fields such as the fabrication industry, the automotive industry, and medical fields. The fiber laser apparatus is characterized in that it is superior in beam quality and light focusing property as compared with a conventional laser apparatus (for example, a carbon dioxide laser apparatus). Furthermore, since the fiber laser apparatus does not require spatial optical components, advantages such as the elimination of problems related to alignment, as well as elimination of the need for maintenance are realized.

Patent Document 1 discloses a fiber laser apparatus in which a filter unit is provided in an amplifying fiber to which rare earth ions are added to a core so that only a specific higher-order mode propagates in addition to the fundamental mode. In this fiber laser apparatus, rare earth ions distributed in the region excluding the core center and the vicinity of the core center (that is, the region in the vicinity of the outer periphery portion of the core) also contribute to the amplification of light by propagating a specific higher-order mode. Therefore, it is possible to maintain the beam quality of the emitted light while increasing amplification efficiency via the use of rare earth ions.

CITATION LIST

[Patent Document]
 [Patent Document 1]
 Japanese Unexamined Patent Application, First Publication No. 2018-190834

In a high-power fiber laser apparatus, the phenomenon known as "Transverse Mode Instability" (also referred to as Thermal Modal Instability, or "TMI") may occur. The TMI phenomenon is a phenomenon in which as the power of the pumping light being applied to the amplifying fiber is increased, periodic thermal gratings due to quantum defects occur, and coupling between modes from the fundamental mode to the higher-order mode occurs, so that the output of the signal light (laser light) is restrained or the beam quality of the signal light deteriorates. In Patent Document 1, the TMI phenomenon is not considered at all. So there is room for improvement with regards to increasing the conversion efficiency from the pumping light to the signal light.

SUMMARY

One or more embodiments of the invention provides an optical device and a fiber laser apparatus capable of increasing the conversion efficiency from pumping light to signal light.

An optical device according to one or more embodiments includes: a first fiber (13) including a first reflector (13a); a second fiber (15) including a second reflector (15a); and an amplifying fiber (14) having a first end (14a) connected to the first fiber and a second end (14b) connected to the second fiber, and having a normalized frequency equal to 5.13 or higher, in which the amplifying fiber is wound so as not to intersect on one plane and so as to have the first end located on an inside thereof, and has an outer section (SC1) in which the amplifying fiber is wound in a circular manner and an inner section (SC2) in which the amplifying fiber is wound so as to have at least two first arc portions (AR1) having a radius of curvature set such that a higher-order mode higher than an LP11 mode has loss.

In the optical device according to one or more embodiments, the amplifying fiber is wound so as not to intersect on the same plane and so as to have the first end located on an inside thereof. This amplifying fiber has an outer section in which the amplifying fiber is wound in a circular manner, and an inner section in which the amplifying fiber is wound so as to have at least two first arc portions having a radius of curvature set such that a higher-order mode higher than an LP11 mode has loss. By removing the higher-order mode higher than the LP11 mode generated at the connection point between the first fiber and the first end of the amplifying fiber at the first arc portion of the inner section, the formation of the thermal grating is reduced and the TMI phenomenon does not occur. As a result, the conversion efficiency from the pumping light to the signal light can be increased. Further, because the amplifying fiber does not intersect on the same plane (because the amplifying fiber is wound such that the first end is located on the inside), as compared to the case where the amplifying fiber intersects, the temperature of the amplifying fiber does not easily rise, thereby increasing the conversion efficiency.

Further, in the optical device according to one or more embodiments, in the inner section, the amplifying fiber may be wound such that one of the first arc portions and a second arc portion (AR2) having a radius of curvature larger than the radius of curvature of the first arc portions appear alternately.

Further, in the optical device according to one or more embodiments, in the inner section, the amplifying fiber may be wound in an elliptical shape.

Further, in the optical device according to one or more embodiments, at least two of the first arc portions may be formed at positions where the distance from the first end is shorter than the coherent length.

Further, in the optical device according to one or more embodiments, the amplifying fiber may be a few-mode fiber through which light in a plurality of modes is capable of propagating, and the first arc portions may be bent such that light in a higher-order mode higher than a predetermined mode is removed from the core of the amplifying fiber.

Further, in the optical device according to one or more embodiments, a reflectivity of the first reflector may be higher than a reflectivity of the second reflector.

Further, the optical device according to one or more embodiments may include a first reinforcement (Q1) accommodating the first end and a second reinforcement (Q2) accommodating the second end.

Further, in the optical device according to one or more embodiments, the second end may be disposed outside the outer section, and at least two third arc portions (AR3) having a radius of curvature set such that the higher-order mode higher than the LP11 mode has loss may be formed between the outer section and the second end.

A fiber laser apparatus (1 to 3) according to one or more embodiments includes an optical device according to any one of the above; a plurality of pumping light sources (11, 18); and a combiner (12, 19) that couples pumping light emitted from the plurality of pumping light sources to the optical device.

Further, in the fiber laser apparatus according to one or more embodiments, the combiner may couple the pumping light to at least either one of the first fiber or the second fiber of the optical device.

According to one or more embodiments, an increase in conversion efficiency from the pumping light to the signal light can be seen as an effect.

DETAILED DESCRIPTION

Hereinafter, an optical device and a fiber laser apparatus according to one or more embodiments will be described in detail with reference to the drawings. Further, the present invention is not limited to the embodiments below.

First Embodiment

<Fiber Laser Apparatus>

Figure 1:
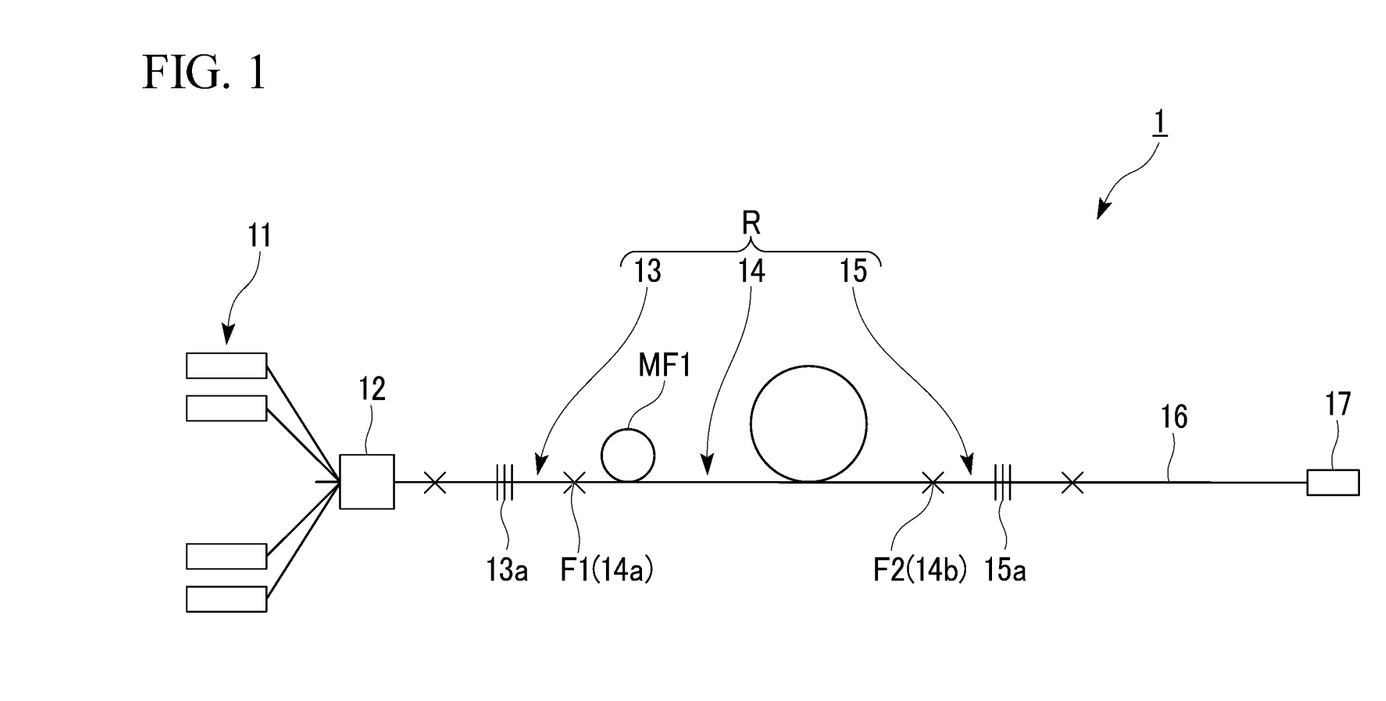
FIG. 1 is a diagram showing a main configuration of a fiber laser apparatus according to a first embodiment of the present invention.

FIG. 1 is a diagram showing a main configuration of a fiber laser apparatus according to a first embodiment. As shown in FIG. 1, a fiber laser apparatus 1 of the present embodiment includes a plurality of pumping light sources 11, a combiner 12, a resonator fiber 13 (first fiber), an amplifying fiber 14, a resonator fiber 15 (second fiber), a delivery fiber 16, and an output end 17. Such a fiber laser apparatus 1 is a so-called forward pumping-type fiber laser apparatus.

Here, the resonator fiber 13, the amplifying fiber 14, and the resonator fiber 15 configure an optical device R. The optical device R is an oscillator that generates signal light, which is laser light, from the pumping light that is outputted by the pumping light sources 11. The optical device R may include other components (for example, the delivery fiber 16, the output end 17, or the like).

In the present specification, the pumping light source 11 side may be referred to as "front end" and the output end 17 side may be referred to as "rear end" when viewed from the amplifying fiber 14.

Further, in FIG. 1, fusion spliced portions of various fibers are indicated by x marks. The fusion spliced portions are actually disposed inside the reinforcing portions Q1 and Q2 and protected (see FIG. 2). The reinforcing portions Q1 and Q2 include, for example, a fiber accommodating body having a groove capable of accommodating optical fibers, and a resin for fixing various fibers to the fiber accommodating body in a state where the fusion spliced portion is accommodated in the groove of the fiber accommodating body. In addition, even in the drawings other than FIG. 1, the fusion spliced portions of various fibers are indicated by x.

The pumping light source 11 outputs the pumping light (forward pumping light). The number of the pumping light sources 11 may be any number depending on the power of the laser light output from the output end 17 of the fiber laser apparatus 1. As an example of the pumping light source 11, a laser diode may be used. The combiner 12 couples the pumping light output of each of the pumping light sources 11 to the front end portion of the optical device R (the front end portion of the resonator fiber 13).

The front end portion of the resonator fiber 13 is fused to the combiner 12, and the rear end portion of the resonator fiber 13 is fused to the front end portion 14a (first end) of the amplifying fiber 14. In the following, the fusion spliced portion between the resonator fiber 13 and the amplifying fiber 14 will be referred to as "fusion spliced portion F1". A High Reflectivity-Fiber Bragg Grating (HR-FBG) 13a (first reflector) is formed in the core of the resonator fiber 13. The HR-FBG 13a is adjusted so as to reflect light having a wavelength of signal light with a reflectivity of almost 100%, among the light emitted by the active element of the amplifying fiber 14 in the excited state. The HR-FBG 13a has a structure in which a portion having a high refractive index is repeated at a constant intervals along the longitudinal direction thereof.

The amplifying fiber 14 includes a core to which one or more types of active elements are added, a first cladding covering the core, a second cladding covering the first cladding, and a coating covering the second cladding. That is, the amplifying fiber 14 is a double-clad fiber. As the active element added to the core, for example, a rare earth element such as erbium (Er), ytterbium (Yb), or neodymium (Nd) is used. These active elements emit light in the excited state.

Silica glass or the like may be used as the core, and Silica glass or the like may be used as the first cladding. As for the second cladding, a resin such as a polymer may be used. As for the coating, a resin material such as an acrylic resin or a silicone resin may be used. The amplifying fiber 14 is a so-called few-mode fiber through which light in a plurality of modes is capable of propagating. The number of modes propagated through the few-mode fiber is, for example, 2 or more and 25 or less.

The normalized frequency of the amplifying fiber 14 may be 3.83 or higher. The normalized frequency of the amplifying fiber 14 may also be equal to 5.13 or higher. An amplifying fiber having a normalized frequency equal to 5.13 or higher is able to have a larger core diameter and a larger fiber effective area as compared with an amplifying fiber having a normalized frequency equal to 3.83 or higher, so that the nonlinear optical effect can be reduced. Here, the normalized frequency is one of the indexes representing the specifications of the optical fiber, and defines the number of modes propagating through the optical fiber. The number of modes that propagates through an optical fiber increases as the normalized frequency increases, and decreases as the normalized frequency decreases.

When the normalized frequency is less than 5.13 (in the case of three significant digits), the modes capable of propagating in the optical fiber are a total of 4 modes including LP02 mode, LP21 mode, and LP11 mode, which are higher-order modes, and LP01 mode which is the fundamental mode. When the normalized frequency of the amplifying fiber 14 is 5.13 or higher, higher-order modes are capable of propagating through the amplifying fiber 14, in addition to the above four modes.

When the normalized frequency is less than 3.83 (in the case of three significant digits), the modes capable of propagating in the optical fiber are a total of two modes, that is, LP11 mode and LP01 mode. When the normalized frequency is less than 2.40 (in the case of three significant digits), the LP01 mode is the only mode capable of propagating in the optical fiber. For details regarding the normalized frequency, for example, Patent Document 1 described above is referred to.

A mode filter MF1 is provided in the vicinity of the fusion spliced portion F1 in the amplifying fiber 14. This mode filter MF1 is provided to remove the higher-order mode (higher-order mode in which the TMI phenomenon may occur) generated in the fusion spliced portion F1 between the resonator fiber 13 and the amplifying fiber 14 to restrain the TMI phenomenon. The mode filter MF1 is achieved, for example, by bending a part of the amplifying fiber 14, and is designed to remove the higher-order modes higher than the LP11 mode (for example, LP02 mode, LP21 mode, or the like). That is, the mode filter MF1 is designed such that the LP01 mode and the LP11 mode are able to pass through. The specific configuration of the optical device R including the mode filter MF1 will be described later.

The front end portion of the resonator fiber 15 is fused to the rear end portion 14b (second end) of the amplifying fiber 14, and the rear end portion of the resonator fiber 15 is fused to the front end portion of the delivery fiber 16. In the following, the fusion spliced portion between the resonator fiber 15 and the amplifying fiber 14 will be referred to as "fusion spliced portion F2". An Output Coupler-Fiber Bragg Grating (OC-FBG) 15a (second reflector) is formed in the core of the resonator fiber 15. The OC-FBG 15a has substantially the same structure as the HR-FBG 13a, but is adjusted to reflect light with a lower reflectivity than the HR-FBG 13a. For example, the OC-FBG 15a is adjusted such that the reflectivity of the light of signal light wavelength is about 10 to 20%.

In the amplifying fiber 14, the signal light reflected by the HR-FBG 13a and the OC-FBG 15a reciprocates in the longitudinal direction of the amplifying fiber 14. The signal light is amplified along with this reciprocation to become laser light. In this way, in the optical device R, the light is amplified and signal light (laser light) is generated.

The delivery fiber 16 transmits the laser light generated in the optical device R. The delivery fiber 16 includes a core, a cladding surrounding the core, and a coating covering the cladding. As the delivery fiber 16, for example, a single mode fiber may be used. The delivery fiber 16 may be, for example, a multi-mode fiber or a few-mode fiber.

The output end 17 is connected to the rear end portion of the delivery fiber 16, and emits the laser light transmitted by the delivery fiber 16. The output end 17 includes a columnar body (light transmitting columnar member) that transmits the laser light transmitted by the delivery fiber 16. This member is a so-called end cap.

<Optical Device>

Figure 2:
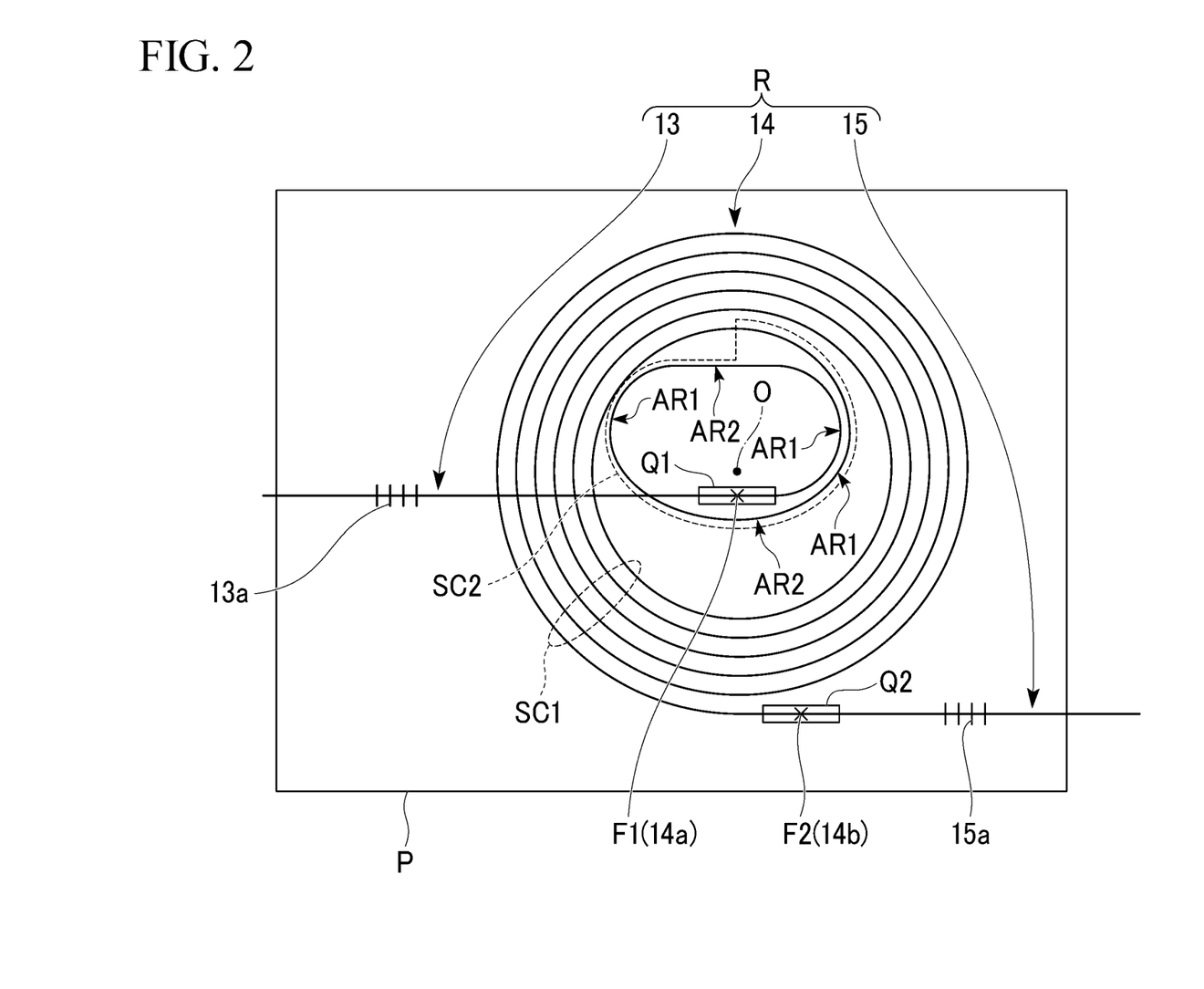
FIG. 2 is a plan view of an optical device according to the first embodiment of the present invention.

FIG. 2 is a plan view of an optical device according to the first embodiment. In FIG. 2, the same components as those shown in FIG. 1 are designated using the same reference numerals. As shown in FIG. 2, the optical device R includes a resonator fiber 13, an amplifying fiber 14, and a resonator fiber 15, and is mounted on a heat sink P. The heat sink P is, for example, a flat plate-shaped member made of a material having high thermal conductivity (for example, aluminum, copper, or the like). The heat sink P is provided to cool the optical device R. The heat sink P may have a flow path inside which the refrigerant flows.

The amplifying fiber 14 is wound so as not to intersect on one plane (on the heat sink P). Specifically, the amplifying fiber 14 is wound in one direction (in the example shown in FIG. 2, turn right (clockwise) from the end portion 14b) so as to have the end portion 14a (first end) located on the innermost circumference and have the end portion 14b (second end) located on the outermost circumference, and so as not to intersect on the same plane (on the heat sink P). That is, in the amplifying fiber 14 is wound such that the fusion spliced portion F1 between the amplifying fiber 14 and the resonator fiber 13 is located at the innermost circumference, and the fusion spliced portion F2 between the amplifying fiber 14 and the resonator fiber 15 is located at the outermost circumference.

The resonator fiber 13 connected to the amplifying fiber 14 extends to the outside of the amplifying fiber 14 (in the example shown in FIG. 2, the left side of the paper) so as to intersect the amplifying fiber 14. In the example shown in FIG. 2, the HR-FBG 13a is placed outside the amplifying fiber 14, but the HR-FBG 13a may be placed inside the amplifying fiber 14. The resonator fiber 15 connected to the amplifying fiber 14 extends to the right side of the paper.

Here, the resonator fibers 13 and 15 do not substantially contain rare earth elements, and are less likely to generate heat than the amplifying fiber 14. Therefore, as shown in FIG. 2, even when the resonator fiber 13 is disposed so as to intersect the amplifying fiber 14, the heat dissipation effect of the optical device R as a whole is able to be substantially maintained. Therefore, it is possible to reduce the damage caused by the heat generated in the amplifying fiber 14.

It should be noted that a reinforcing portion Q1 (first reinforcement) for reinforcing the fusion spliced portion F1 may be provided, or a reinforcing portion Q2 (second reinforcement) for reinforcing the fusion spliced portion F2 may be provided. The reinforcing portions Q1 and Q2 may have a constant linear portion as illustrated in FIG. 2 in order to prevent damage to the fusion spliced portions F1 and F2 as well as in the vicinity of the fusion spliced portions F1 and F2.

Further, the amplifying fiber 14 has an outer section SC1 and an inner section SC2. The outer section SC1 is a section in which the amplifying fiber is wound in a circular manner (vortex) around the axis O to form a coil shape having an empty space inside. In the outer section SC1, the radius of curvature of the amplifying fiber 14 gradually decreases from the end portion 14b to the end portion 14a, and becomes a minimum at the innermost circumference of the outer section SC1 (the boundary between the outer section SC1 and the inner section SC2).

The inner section SC2 is placed in the empty space inside the coil-shaped (vortex-shaped) outer section SC1. The inner section SC2 is a section in which the amplifying fiber 14 is wound such that at least two arc portions having a radius of curvature set such that the higher-order mode higher than the LP11 mode has loss. Here, the end portion 14a of the amplifying fiber 14 defines the end point of the inner section SC2, and is located at the innermost circumference of the amplifying fiber 14 as described above. Therefore, it can be said that the amplifying fiber 14 is wound such that the end portion 14a is located inside the region surrounded by the inner section SC2 of the amplifying fiber 14.

In the inner section SC2 illustrated in FIG. 2, the amplifying fiber is wound in an elliptical shape for one and a half rounds. That is, in the inner section SC2 illustrated in FIG. 2, the amplifying fiber 14 is wound from the end portion 14a to the outer section SC1 such that one of the first arc portions AR1 (first arc portion) having a radius of curvature set such that a higher-order mode higher than the LP11 mode has loss, and an arc portion AR2 (second arc portion) having a radius of curvature larger than the radius of curvature of the arc portion AR1 appear alternately.

The arc portion AR1 of the inner section SC2 is a portion that functions as the mode filter MF1 shown in FIG. 1. That is, the arc portion AR1 of the inner section SC2 is provided to remove the higher-order mode (higher-order mode in which the TMI phenomenon may occur) generated in the fusion spliced portion F1 between the resonator fiber 13 and the amplifying fiber 14. The reason why at least two such arc portions AR1 are provided in the inner section SC2 is to adequately remove the above-described higher-order mode. Further, by winding the arc portions AR1 and AR2 so as to appear alternately, it is possible to form a mode filter MF1 capable of giving a sufficient loss to a higher-order mode without the amplifying fiber 14 coming into contact with the reinforcing portion Q1.

As illustrated in FIG. 2, by winding the inner section SC2 in an elliptical shape, the total length of the arc portion AR1 (the total length of the arcs of the arc portions AR1) is made equal to or greater than the length of one circumference of a circle having the radius of curvature of the arc portion AR1, and the reinforcing portion Q1 having a linear portion is able to be placed inside the wound amplifying fiber 14. By setting the total length of the arc portion AR1 to be equal to or greater than the length of one circumference of the circle having the radius of curvature of the arc portion AR1, it is possible to give a sufficient loss to the higher-order mode. Here, for example, if the length of the arc portion AR1 is only a half circumference immediately after the fusion spliced portion F1, there is a possibility that adequate loss may not be given to the higher-order mode when the temperature of the amplifying fiber 14 is high. The radius of curvature of the arc portion AR2 may be larger than the radius of curvature of the arc portion AR1, and may be larger or smaller than the minimum value of the radius of curvature of the outer section SC1. Alternatively, the arc portion AR2 may be linear.

Here, the minimum value $r_{min}$ of the radius of curvature of the arc portion AR1 may be equal to or less than twice the radius of curvature $r_s$ that does not deteriorate the quality of the beam propagating in the amplifying fiber 14 and satisfies the mechanical reliability of the amplifying fiber 14. The radius of curvature $r_b$ that does not deteriorate the quality of the beam propagating in the amplifying fiber 14 is defined as the radius of curvature in which light in higher-order modes higher than a predetermined mode is removed from the core of the amplifying fiber 14. For example, when the predetermined mode is light in a higher-order mode higher than the LP11 mode, the radius of curvature $r_b$ is the radius of curvature at which light in a higher-order mode higher than the LP11 mode is removed (has loss) from the core of the amplifying fiber.

The radius of curvature $r_s$ that satisfies the mechanical reliability of the amplifying fiber 14 is defined as the radius of curvature at which the amplifying fiber 14 ruptures when it is bent. Assuming that the larger of the radius of curvature $r_b$ and the radius of curvature $r_s$ is set to be the radius of curvature $r_f$, the minimum value $r_{min}$ of the radius of curvature of the arc portion AR1 is set so as to satisfy $r_f \lesssim r_{min} \leq 2r_s$. By setting the minimum value $r_{min}$ of the radius of curvature of the arc portion AR1 so as to satisfy the above equation, it is possible to ensure the desired beam quality and mechanical intensity. It is also possible to make the footprint of the amplifying fiber 14 smaller. That is, it is possible to provide smaller optical components while ensuring desired beam quality and mechanical intensity.

The mode filter MF1 (arc portion AR1) may be disposed in the vicinity of the fusion spliced portion F1 which is the location where the higher-order mode is generated. The reason is as follows. That is, in the fiber laser apparatus 1 as in the present embodiment, to reduce the nonlinear optical effect, the longitudinal mode (oscillation wavelength) is also set to the multi-mode. Therefore, in the fusion spliced portion F1, coupling between modes occurs from the fundamental mode (LP01 mode) to the higher-order mode regardless of the wavelength. Because of a difference in propagation speeds for each wavelength, in the higher-order mode generated by the fusion spliced portion F1, coherence is lost when the wave is propagated for a while.

That is, at a location separated by a coherent length or more (the persistence length of beats generated by the mode interference) from the fusion spliced portion F1, both fundamental mode and the higher-order mode lose coherence, so that the thermal grating becomes smaller, and as a result, the coupling to the higher-order mode becomes smaller. Even when the higher-order mode is removed at a location separated by a coherent length or more, the coupling to the higher-order mode occurs all the way to that location. Therefore, it is difficult to exert the effect from the viewpoint of reducing the decrease in efficiency. For this reason, the mode filter MF1 (arc portion AR1) may be disposed in the vicinity of the fusion spliced portion F1.

Based on this, the distance between the fusion spliced portion F1 (end portion 14a) and the mode filter MF1 (arc portion AR1) may be shorter than the coherent length in the light having the wavelength of the signal light propagating through the amplifying fiber 14. Further, the longer the length of the mode filter MF1 (total length of the arc portion AR1), the better. However, the mode filter MF1 (at least two arc portions AR1) may be disposed in a region between the fusion spliced portion F1 (end portion 14a) and a position separated by a coherent length from the fusion spliced portion F1 (end portion 14a).

Further, when the reinforcing portion Q1 for reinforcing the fusion spliced portion F1 is provided, the mode filter MF1 (arc portion AR1) may be provided immediately after the rear end portion of the reinforcing portion Q1. The optical characteristics of the portion of the amplifying fiber 14 near the fusion spliced portion F1 may likely to change due to heat generation. In such a case, the distance between the fusion spliced portion F1 (end portion 14a) and the mode filter MF1 (arc portion AR1) may be increased. However, the distance may be shorter than the above-described coherent length.

Here, assuming that the difference between the effective refractive indexes $N_{eff}$ of any two modes propagating through the amplifying fiber 14 is $\Delta N_{\mathit{eff}}$, the propagation wavelength of the amplifying fiber 14 is $\lambda$, and the wavelength width is $\Delta\lambda$, the coherent length Lc, which is the persistence length of the beats generated by mode interference, is expressed by the following equation (1).

$$Lc=2/\Delta N_{\mathit{eff}} \times \lambda^2/\Delta\lambda \qquad (1)$$

It is assumed that the LP01 mode and the LP02 mode having a propagation wavelength $\lambda$ of 1070 nm and a wavelength width $\Delta\lambda$ of 1 nm propagate through, for example, the core of the amplifying fiber 14 having a relative refractive index difference of 0.3%, a core medium refractive index of 1.45, and a core diameter of 50 μm. At this time, the effective refractive index difference $\Delta N_{\mathit{eff}}$ between the LP01 mode and the LP02 mode is 0.00028. From the above equation (1), the coherent length Lc, which is the persistence length of the beats generated by mode interference, is determined to be 8.18 m.

Figure 3:
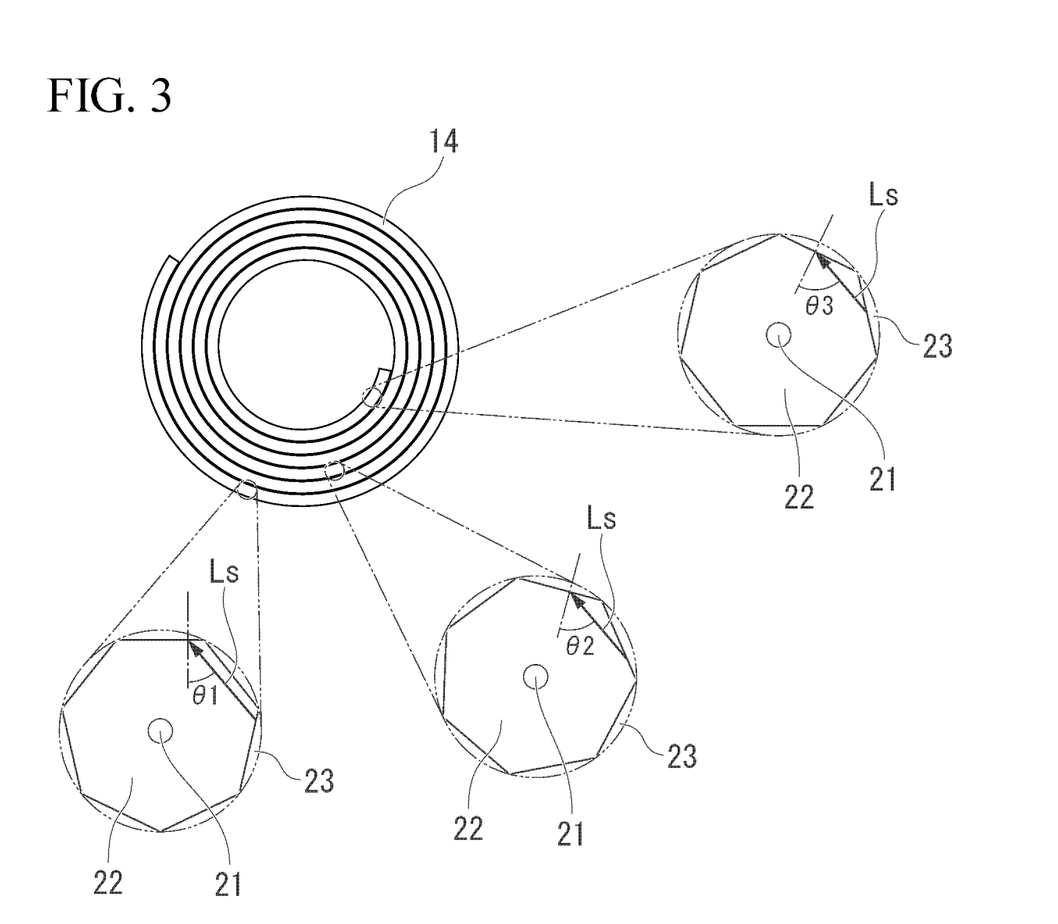
FIG. 3 is an explanatory diagram showing an amplifying fiber to which a permanent twist is imparted, in the first embodiment of the present invention.

Here, the amplifying fiber 14 may be imparted with a permanent twist. FIG. 3 is an explanatory diagram showing an amplifying fiber to which a permanent twist is imparted, in the first embodiment. In the example shown in FIG. 3, the amplifying fiber 14 is a double-clad optical fiber having a core 21, a first cladding 22 covering the outside of the core 21, and a second cladding 23 covering the outside of the first cladding 22. In the cross section perpendicular to the longitudinal direction of the amplifying fiber 14, the cross section of the first cladding 22 is a regular heptagon (non-circular cladding).

Since the boundary between the first cladding 22 and the second cladding 23 is a regular heptagon that is not bi-axially symmetric, it is possible to reduce light that does not reach the core via guidance of the cladding and does not contribute as pumping light, so-called skew light. However, skew light still remains if the cross-sectional shape of the first cladding 22 is only made to be polygonal. In order to further reduce the skew light and further improve the utilization efficiency of the pumping light, the amplifying fiber 14 is wound so as to be twisted in the circumferential direction around the central axis of the amplifying fiber 14.

Since the amplifying fiber 14 is twisted, the orientation of the regular heptagon of the first cladding 22 differs depending on the location of the amplifying fiber 14. Therefore, as shown in FIG. 3, the incident angles θ1, θ2, and θ3 (reflection angles) of the skew light Ls change depending on the location of the amplifying fiber 14 in the longitudinal direction. That is, θ1≠θ2≠θ3. Due to the change in the incident angle and the reflection angle, the skew light Ls inject in to the core 21 while traveling in the first cladding 22, and contributes as pumping light. Thus, it is possible to increase the utilization efficiency of the pumping light, and to increase the power of the output light.

When the twist amount of the amplifying fiber 14 is significantly large, the problem of beam quality deteriorating arises. Therefore, the twist amount of the amplifying fiber 14 may be 3 rotations/m or less. In this case, deterioration of beam quality, specifically, an increase in M2 value can be reduced. The M2 value is an index that quantitatively indicates the deviation from the Gaussian beam, and indicates how many times the beam can be narrowed to the diffraction limit. The amount of twist may be constant over the entire length of the amplifying fiber 14. Alternatively, the twist amount of the amplifying fiber 14 may be set to increase as it approaches the HR-FBG 13a.

Here, the occurrence of the TMI phenomenon is closely related to the occurrence of thermal grating. Examples of the parameters that affect the generation of thermal grating include the following parameters.

$\alpha_{pump}$: Absorption rate of pumping light in the amplifying fiber 14

$P_{pump}$: Power of pumping light input to the amplifying fiber 14 a: Ratio between signal light density and pumping light density

ω: Heat modulation degree (difference or ratio between peaks and valleys in the undulation of light intensity in the amplifying fiber 14 generated by the mode interference)

The TMI phenomenon is more likely to occur the larger $\alpha_{pump}$, $P_{pump}$, and ω are, and is more likely to occur the smaller a is.

As described above, in the present embodiment, the amplifying fiber 14 having a normalized frequency of 5.13 or more is wound so as not to intersect on one plane and such that the end portion 14a is located at the innermost circumference. The amplifying fiber 14 has an outer section SC1 in which the amplifying fiber is wound in a circular manner, and an inner section SC2 in which the amplifying fiber is wound inside the outer section SC1. In the inner section SC2, at least two arc portions AR1 having a radius of curvature set such that a higher-order mode higher than the LP11 mode has loss are formed and the arc portions AR1 function as a mode filter MF1.

The higher-order mode (higher-order mode which may cause the TMI phenomenon) generated in the fusion spliced portion F1 between the resonator fiber 13 and the amplifying fiber 14 is removed by the mode filter MF1 provided in the vicinity of the fusion spliced portion F1 in the amplifying fiber 14. For example, higher-order modes (for example, LP02 mode, LP21 mode, or the like) higher than the LP11 mode propagating through the core of the amplifying fiber 14 are removed by the mode filter MF1.

Thus, because it is possible to reduce the heat modulation degree w among the above-described parameters, the occurrence of the TMI phenomenon is able to be reduced, and as a result, it is possible to increase the conversion efficiency from the pumping light to the signal light. Further, also in the present embodiment, since the reinforcing portion Q1 having the linear portion is able to be placed inside the wound amplifying fiber 14, the reliability (mechanical reliability) is increased. Further, because the amplifying fiber does not intersect on one plane (because the amplifying fiber is wound such that the first end is located inside), as compared to the case where the amplifying fiber intersects, it is possible to prevent the temperature of the amplifying fiber from rising, thereby increasing the conversion efficiency.

Second Embodiment

<Fiber Laser Apparatus>

Figure 4:
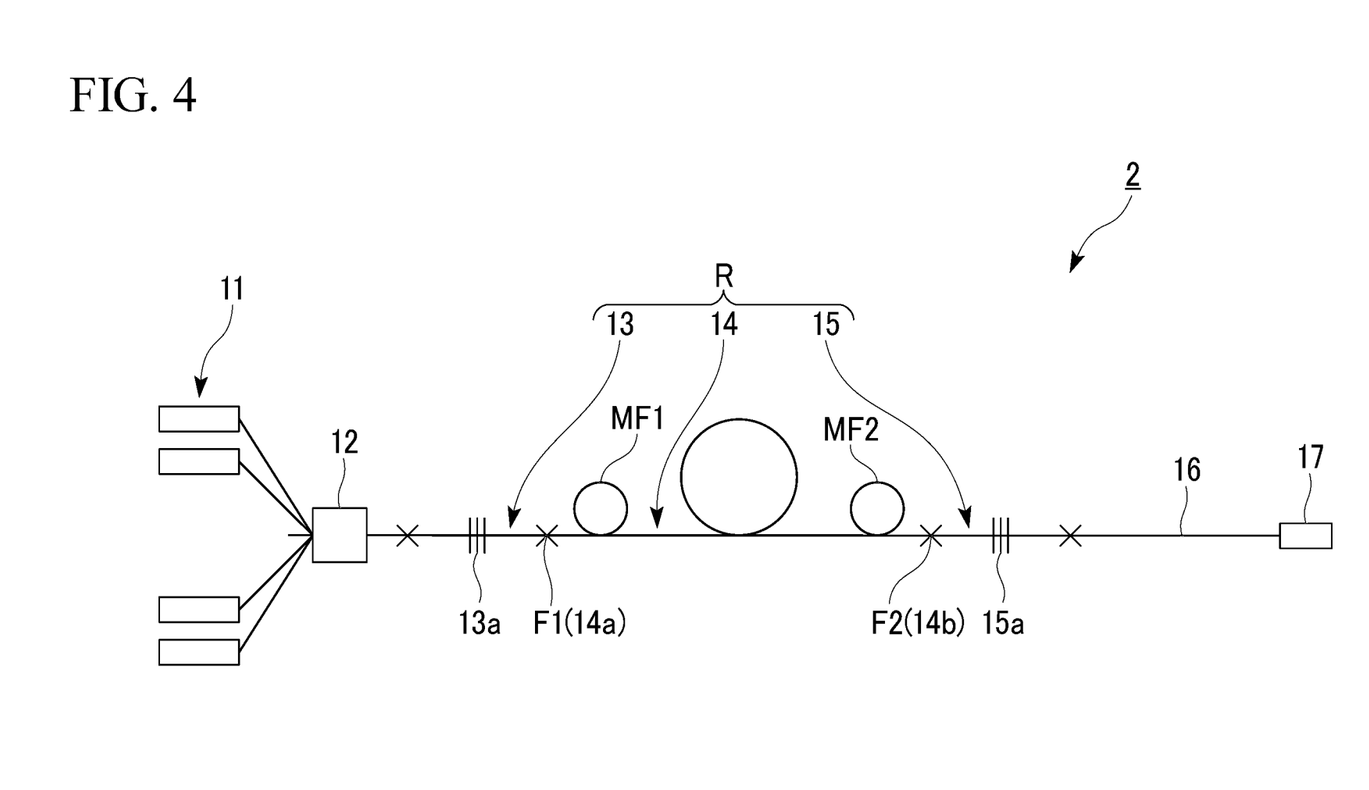
FIG. 4 is a diagram showing a main configuration of a fiber laser apparatus according to a second embodiment of the present invention.

FIG. 4 is a diagram showing a main configuration of a fiber laser apparatus according to a second embodiment. In FIG. 4, the same reference numerals are given to the components similar to those shown in FIG. 1. A fiber laser apparatus 2 of the present embodiment is different from the fiber laser apparatus 1 shown in FIG. 1 in that a mode filter MF2 is formed on the amplifying fiber 14 in addition to the mode filter MF1.

The mode filter MF2 is provided in the vicinity of the fusion spliced portion F2 in the amplifying fiber 14. This mode filter MF2 removes the higher-order mode generated in the fusion spliced portion F2 between the amplifying fiber 14 and the resonator fiber 15. Similar to the mode filter MF1, the mode filter MF2 is achieved, for example, by bending a part of the amplifying fiber 14, and is designed to remove higher-order modes (for example, LP02 mode, LP21 mode, or the like) higher than the LP11 mode. That is, the mode filter MF2 is also designed such that only the LP01 mode and the LP11 mode pass through.

<Optical Device>

Figure 5:
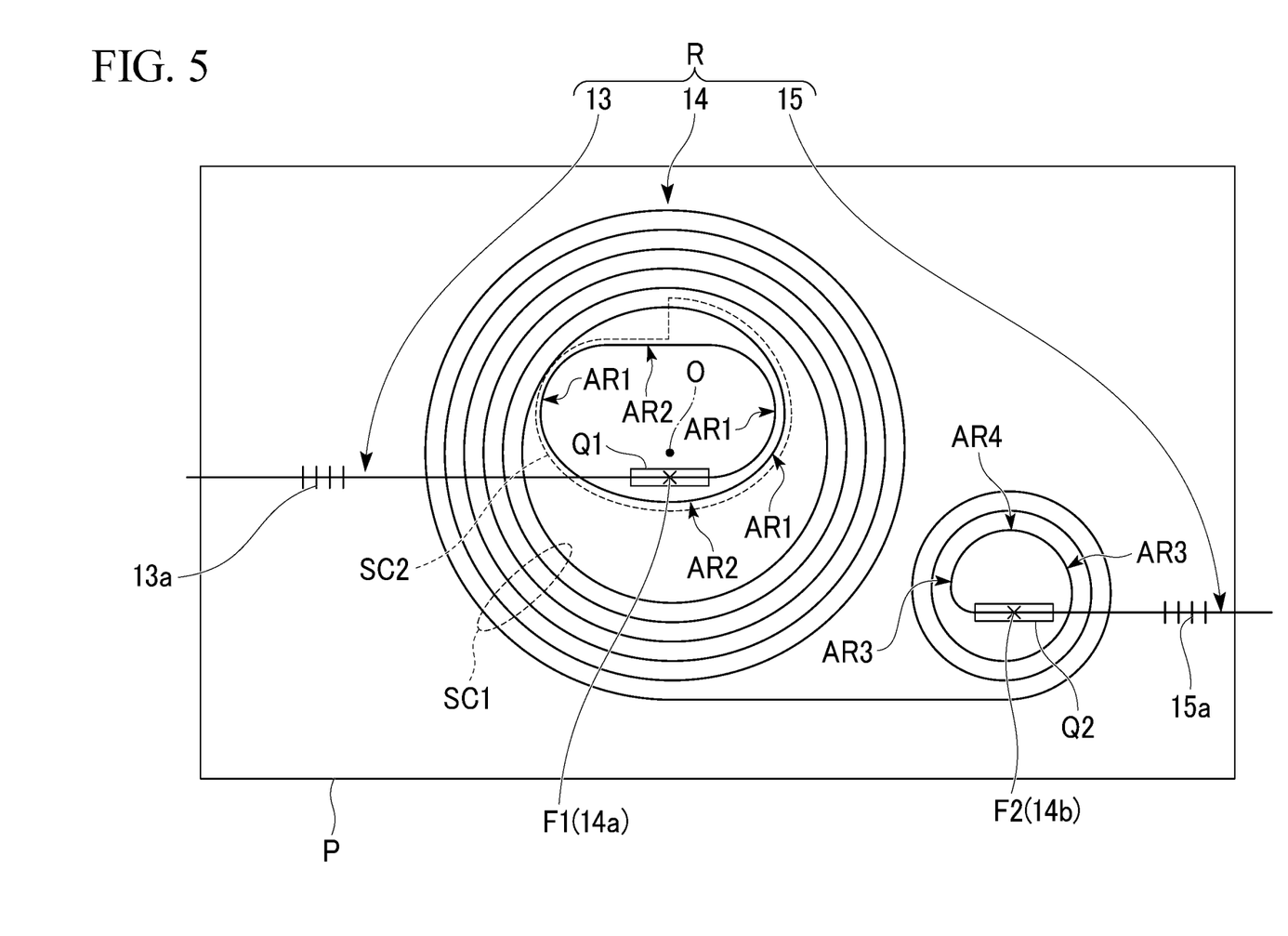
FIG. 5 is a plan view of an optical device according to the second embodiment of the present invention.

FIG. 5 is a plan view of an optical device according to the second embodiment. In FIG. 5, the same components as those shown in FIG. 2 are designated by the same reference numerals. In the optical device R shown in FIG. 5, at least two arc portions AR3 (third arc portions) having a radius of curvature set such that the higher-order mode higher than the LP11 mode has loss are formed between the outer section SC1 and the end portion 14b of the amplifying fiber 14.

The arc portion AR3 is a portion that functions as the mode filter MF2 shown in FIG. 4. That is, the arc portion AR3 is provided to remove the higher-order mode generated in the fusion spliced portion F2 between the amplifying fiber 14 and the resonator fiber 15. The reason why at least two such arc portions AR3 are provided is to adequately remove the above-described higher-order mode. The arc portion AR3 is formed to have the same radius of curvature as the arc portion AR1 formed in, for example, the inner section SC2.

In the example shown in FIG. 5, the optical device R is formed such that the arc portion AR3, the arc portion AR4 having a radius of curvature larger than that of the arc portion AR3, and the arc portion AR3 appear in order from the outer section SC1 to the end portion 14b. Here, the arc portion AR4 is a portion provided for connecting the two arc portions AR3, and is set so as not to intersect itself on one plane and not to intersect the two arc portions AR3. That is, the mode filter MF2 may be configured with an amplifying fiber 14 wound in a circular manner (vortex). The total length of the arc portions AR3 is, for example, equal to or greater than the length of one circumference of a circle having a radius of curvature of the arc portion AR3.

The mode filter MF2 (arc portion AR3) may be disposed in the vicinity of the fusion spliced portion F2 which is the location where the higher-order mode is generated. Further, the distance between the fusion spliced portion F2 (end portion 14b) and the mode filter MF2 (arc portion AR3) may be shorter than the above-described coherent length in the light having the wavelength of the signal light propagating through the amplifying fiber 14. Further, the longer the length of the mode filter MF2 (total length of the arc portions AR3), the better. However, the mode filter MF2 (arc portions AR3) may be disposed in a region between the fusion spliced portion F2 (end portion 14b) and a position separated by a coherent length from the fusion spliced portion F2 (end portion 14b).

Further, when the reinforcing portion Q2 for reinforcing the fusion spliced portion F2 is provided, the mode filter MF2 (arc portion AR3) may be provided immediately before the front end portion of the reinforcing portion Q2. Further, the amplifying fiber 14 may be imparted with a permanent twist in the same manner as in the first embodiment.

Further, even in the present embodiment, the amplifying fiber 14 having a normalized frequency of 5.13 or more is wound so as not to intersect on one plane and have the end portion 14a located at the innermost circumference. The amplifying fiber 14 has an outer section SC1 in which the amplifying fiber is wound in a circular manner (vortex) and an inner section SC2 in which the amplifying fiber is wound inside the outer section SC1. In the inner section SC2, at least two arc portions AR1 having a radius of curvature set such that the higher-order mode higher than the LP11 mode has loss are formed. The arc portion AR1 functions as a mode filter MF1, and higher-order modes (for example, LP02 mode, LP21 mode, or the like) higher than the LP11 mode are removed by the mode filter MF1.

Further, in the present embodiment, at least two arc portions AR3 having a radius of curvature set such that the higher-order mode higher than the LP11 mode has loss are formed between the outer section SC1 and the end portion 14b of the amplifying fiber 14. The arc portion AR3 functions as a mode filter MF2, and higher-order modes (for example, LP02 mode, LP21 mode, or the like) higher than the LP11 mode are removed by the mode filter MF2.

As described above, since it is possible to reduce the above-described heat modulation degree w, the occurrence of the TMI phenomenon is able to be reduced, and as a result, it is possible to increase the conversion efficiency from the pumping light to the signal light. Further, even in the present embodiment, since the reinforcing portion Q1 having the linear portion can be disposed inside the wound amplifying fiber 14, it is possible to increase the reliability (mechanical reliability). Further, because the amplifying fiber does not intersect on one plane (because the amplifying fiber is wound such that the first end is located inside), as compared to the case where the amplifying fiber intersects, the temperature of the amplifying fiber does not easily rise, thereby increasing the conversion efficiency.

Third Embodiment

<Fiber Laser Apparatus>

Figure 6:
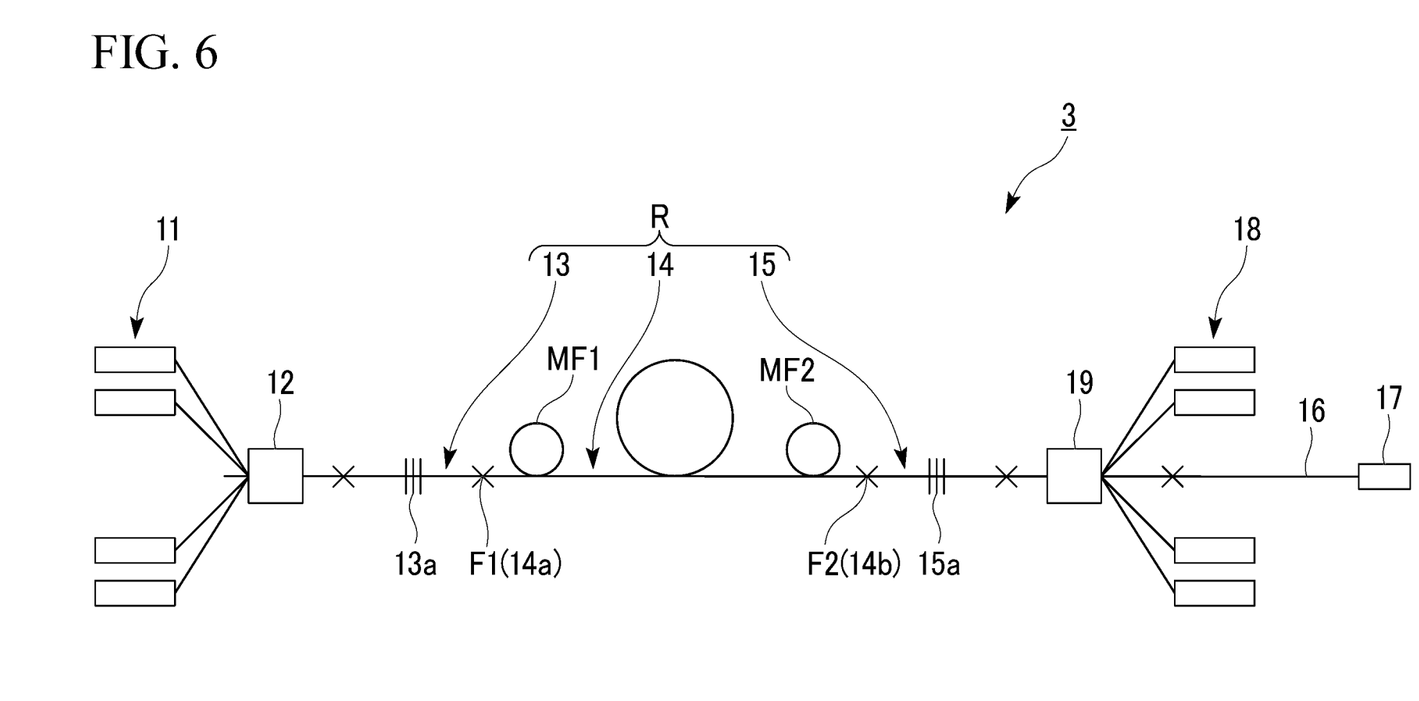
FIG. 6 is a diagram showing a main configuration of a fiber laser apparatus according to a third embodiment of the present invention.

FIG. 6 is a diagram showing a main configuration of a fiber laser apparatus according to a third embodiment. In FIG. 6, the same reference numerals are given to the components similar to those shown in FIG. 4. A fiber laser apparatus 3 of the present embodiment is different from the fiber laser apparatus 2 shown in FIG. 4 in that the fiber laser apparatus 3 includes a plurality of pumping light sources 18 and a combiner 19. Such a fiber laser apparatus 3 is a so-called bidirectional pumping-type fiber laser apparatus.

The pumping light sources 18 output pumping light (backward pumping light). The number of the pumping light sources 18 may be any number depending on the power of the laser light output from the output end 17 of the fiber laser apparatus 3. As the pumping light source 18, for example, a laser diode may be used, like the pumping light source 11. The combiner 19 couples the pumping light outputted by each of the pumping light sources 18 to the rear end portion of the optical device R (the rear end portion of the resonator fiber 15).

The optical device R included in the fiber laser apparatus 3 of the present embodiment has the same configuration as the optical device R included in the fiber laser apparatus 2 of the second embodiment. However, the optical device R included in the fiber laser apparatus 3 of the present embodiment differs from the optical device R included in the fiber laser apparatus 2 of the second embodiment in that not only does it supply the forward pumping light but it also supplies the rear pumping light as well.

Further, even in the present embodiment, the amplifying fiber 14 having a normalized frequency of 5.13 or more is wound so as not to intersect on one plane and have the end portion 14a located at the innermost circumference. The amplifying fiber 14 has an outer section SC1 in which the amplifying fiber is wound in a circular manner (vortex) and an inner section SC2 in which the amplifying fiber is wound inside the outer section SC1. In the inner section SC2, at least two arc portions AR1 having a radius of curvature set such that the higher-order mode higher than the LP11 mode has loss are formed. The arc portion AR1 functions as a mode filter MF1, and higher-order modes (for example, LP02 mode, LP21 mode, or the like) higher than the LP11 mode are removed by the mode filter MF1.

Further, in the present embodiment, at least two arc portions AR3 having a radius of curvature set such that the higher-order mode higher than the LP11 mode has loss are formed between the outer section SC1 and the end portion 14b of the amplifying fiber 14. The arc portion AR3 functions as a mode filter MF2, and higher-order modes (for example, LP02 mode, LP21 mode, or the like) higher than the LP11 mode are removed by the mode filter MF2.

As described above, since it is possible to reduce the above-described heat modulation degree w, the occurrence of the TMI phenomenon is able to be reduced, and as a result, the conversion efficiency from the pumping light to the signal light is able to be increased. Further, even in the present embodiment, since the reinforcing portion Q1 having the linear portion can be disposed inside the wound amplifying fiber 14, it is possible to increase the reliability (mechanical reliability). Further, because the amplifying fiber does not intersect on one plane (because the amplifying fiber is wound such that the first end is located inside), as compared to the case where the amplifying fiber intersects, the temperature of the amplifying fiber does not easily rise, thereby increasing the conversion efficiency.

EXAMPLES

That is, a fiber laser apparatus 1 of the first embodiment, which includes an optical device R configured with an amplifying fiber 14 on which a mode filter MF1 is formed and resonator fibers 13 and 15, are prepared as an example. The amplifying fiber 14 has a normalized frequency of 5.13 or higher, and Yb is added to the core. The amplifying fiber 14 is wound as shown in FIG. 2 and has a coil-shaped (vortex-shaped) outer section SC1 and an inner section SC2 in which an arc portion AR1 functioning as a mode filter MF1 is formed.

Figure 9:
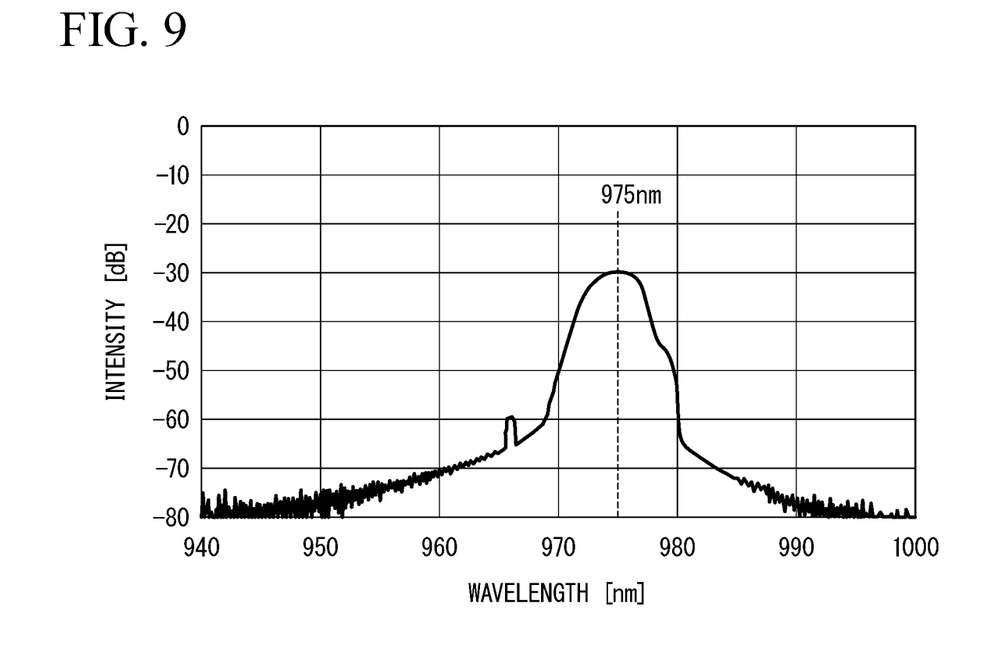
FIG. 9 is a diagram showing the spectrum of pumping light sources used in the example and the comparative examples.

The radius of curvature of the arc portion AR1 is set such that higher-order modes (for example, LP02 mode, LP21 mode, or the like) higher than the LP11 mode has loss (to have the modes removed). The reflectivity of the HR-FBG 13a in the resonator fiber 13 is set to 99%, and the reflectivity of the OC-FBG 15a in the resonator fiber 15 is set to 10%. FIG. 9 is a diagram showing the spectrum of pumping light sources used in the example and the comparative examples. As shown in FIG. 9, the wavelength at which the intensity of the pumping light emitted from the pumping light source 11 peak is 975 nm.

Figure 7A:
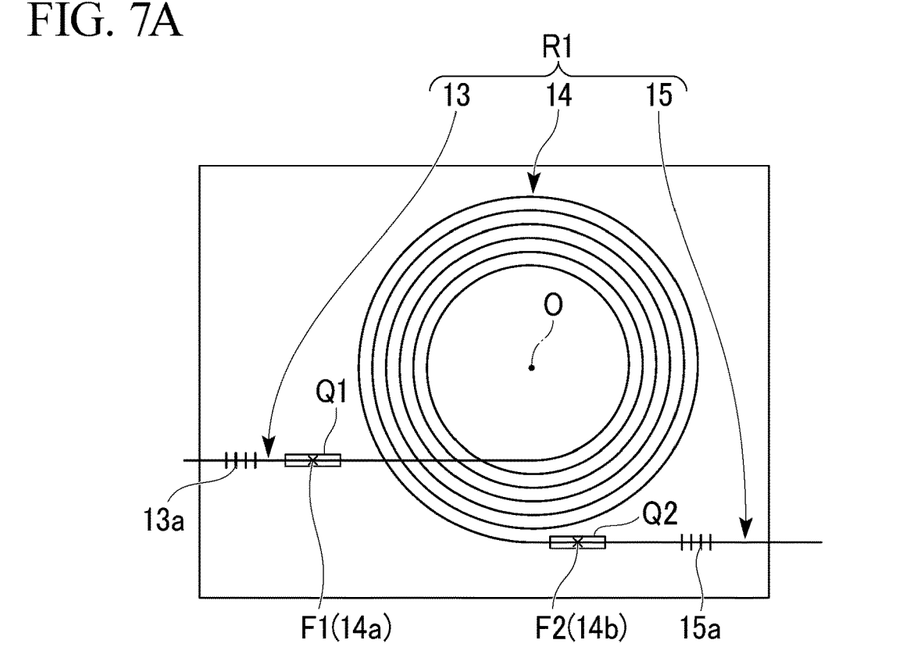
FIG. 7A is a plan view of an optical device included in a fiber laser apparatus of a comparative example.
Figure 7B:
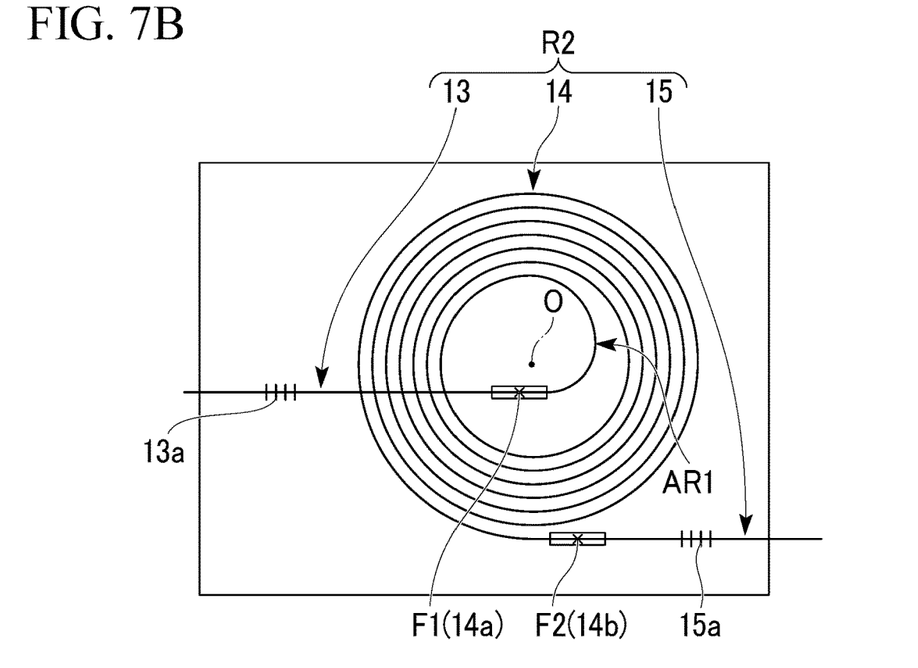
FIG. 7B is a plan view of an optical device included in a fiber laser apparatus of another comparative example.

As comparative examples, fiber laser apparatus including the optical devices R1 and R2 having the configurations shown in FIGS. 7A and 7B have been prepared. Other configurations are the same as those of the fiber laser apparatus 1 of the above-described example. FIGS. 7A and 7B are plan views of an optical device included in a fiber laser apparatus of comparative examples. The optical device R1 shown in FIG. 7A is provided in the fiber laser apparatus of Comparative Example 1, and the optical device R2 shown in FIG. 7B is provided in the fiber laser apparatus of Comparative Example 2.

As shown in FIG. 7A, the optical device R1 included in the fiber laser apparatus of Comparative Example 1 does not include an arc portion AR1 having a radius of curvature set such that the higher-order mode higher than the LP11 mode has loss. Further, the fusion spliced portion F1 and the reinforcing portion Q1 between the resonator fiber 13 and the amplifying fiber 14 are disposed outside the wound amplifying fiber 14.

As shown in FIG. 7B, in the optical device R2 included in the fiber laser apparatus of Comparative Example 2, only one arc portion AR1 having a radius of curvature set such that the higher-order mode higher than the LP11 mode has loss is formed. The length of the arc portion AR1 is the length of a half circumference of a circle having a radius of curvature of the arc portion AR1.

Figure 8:
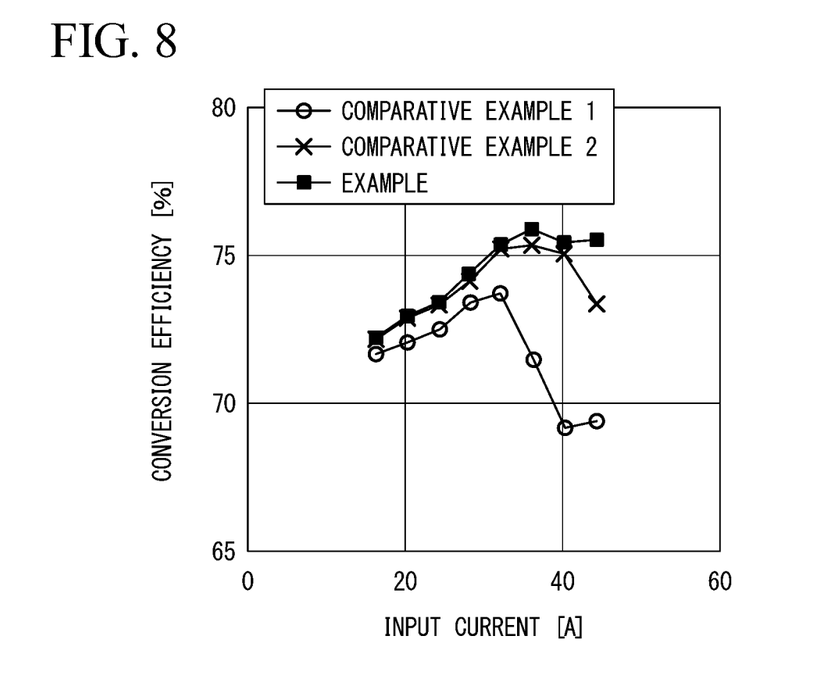
FIG. 8 is a graph showing a relationship between an input current and a conversion efficiency in each of the fiber laser apparatus of an example and the comparative examples.

FIG. 8 is a graph showing a relationship between an input current and a conversion efficiency in each of the fiber laser apparatus of the example and the comparative examples. The horizontal axis of the graph shown in FIG. 8 is the current [A] applied to the pumping light source 11, and the vertical axis is the conversion efficiency [%] from the pumping light to the laser light. The larger the value on the horizontal axis, the larger the power of the pumping light input to the amplifying fiber 14.

As shown in FIG. 8, in the fiber laser apparatus of Comparative Example 1, when the input current exceeded 36 A, the linearity between the input current and the conversion efficiency was broken, and a sharp decrease in conversion efficiency was confirmed. A sharp decrease in conversion efficiency was confirmed up until the input current reached 40 A. Further, in the fiber laser apparatus of Comparative Example 2, even when the input current exceeded 36 A, the linearity between the input current and the conversion efficiency was more or less maintained, with the ability to restrain the decrease in the conversion efficiency. However, when the input current exceeded 40 A, a sharp decrease in conversion efficiency was confirmed. On the other hand, in the fiber laser apparatus of the example, a sharp decrease in conversion efficiency was not confirmed even when the input current exceeded 40 A.

In the present example and the comparative examples, pumping light having a wavelength at which the intensity peaks is 975 nm is used. Since this wavelength (975 nm) coincides with the absorption peak wavelength in the amplifying fiber 14 to which Yb is added, it is considered that thermal grating due to beats occurs in Comparative Example 1 and the conversion efficiency decreases due to the above-described TMI phenomenon.

Here, in Comparative Example 2, it is considered that the formation of the thermal grating due to beats can be reduced by removing the extra higher-order mode to some extent by the arc portion AR1 shown in FIG. 7B. However, in Comparative Example 2, since the arc portion AR1 is not adequately long and the higher-order mode is insufficiently removed, it is considered that thermal grating due to beats occurs when the input current exceeds 40 A and the conversion efficiency decreases due to the above-described TMI phenomenon.

On the other hand, in the example, it is considered that it is possible to reduce the formation of the thermal grating due to beats by removing the extra higher-order mode by the mode filter MF1 (plural arc portions AR1). Thus, it is considered that even when the input current exceeds 40 A, it is considered that the formation of thermal grating due to beats is reduced and the conversion efficiency does not sharply decrease due to the above-described TMI phenomenon. In this way, it is possible to confirm the effect of sufficiently removing unnecessary higher-order modes by using the mode filter MF1 (plural arc portions AR1).

Although the embodiments of the present invention have been described above, the present invention is not limited to the above embodiments and can be freely changed within the scope of the present invention.

For example, in the optical device R shown in FIGS. 2 and 5, the HR-FBG 13a and the OC-FBG 15a may be interchanged. That is, the OC-FBG 15a may be formed on the resonator fiber 13, and the HR-FBG 13a may be formed on the resonator fiber 15.

Further, although the fiber laser apparatus 1 to 3 of the above-described embodiments have one output end 17, an optical fiber or the like may be further connected to the tip of the output end 17. Further, a beam combiner may be connected to the tip of the output end 17 so as to bundle laser light from a plurality of laser apparatus.

Further, the fiber laser apparatus of the first and second embodiments described above are a so-called forward pumping-type fiber laser apparatus, and the fiber laser apparatus of the third embodiment described above is a so-called bidirectional pumping-type fiber laser apparatus. However, the fiber laser apparatus may be a so-called backward pumping-type fiber laser apparatus in which the pumping light source 11 and the combiner 12 included in the fiber laser apparatus 3 (see FIG. 6) of the third embodiment are omitted.

In addition, without departing from the spirit of the present invention, it is possible to appropriately replace the constituent elements in the above-described embodiments with well-known constituent elements, and the above-described embodiments and modification examples may be appropriately combined.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 to 3: Fiber laser apparatus
11: Pumping Light Source
12: Combiner
13: Resonator Fiber (First Fiber)
13a: HR-FBG (First Reflector)
14: Amplifying Fiber
14a, 14b: End Portion
15: Resonator Fiber (Second Fiber)
15a: OC-FBG (Second Reflector)
18: Pumping Light Source
19: Combiner
AR1 to AR3: Arc Portion
Q1, Q2: Reinforcing Portion (First, Second Reinforcement)
R: Optical Device
SC1: Outer Section
SC2: Inner Section

What is claimed is:
1. An optical device comprising:
a first fiber including a first reflector;
a second fiber including a second reflector; and
an amplifying fiber that has a normalized frequency that is greater than or equal to 5.13 and is wound so as not to intersect on one plane and including:
an outer section wound in a circular manner;
an inner section having first arc portions and wound such that at least two of the first arc portions have a radius of curvature in which a higher-order mode that is higher than an LP11 mode has loss;
a first end connected to the first fiber and disposed on an inside of the amplifying fiber; and
a second end connected to the second fiber.
2. The optical device according to claim 1, wherein the inner section of the amplifying fiber has a second arc portion with a radius of curvature larger than the radius of curvature of the at least two first arc portions, and the inner section of the amplifying fiber is wound such that one of the first arc portions and the second arc portion are disposed alternately.
3. The optical device according to claim 1, wherein the inner section of the amplifying fiber is wound in an elliptical shape.
4. The optical device according to claim 1, wherein two or more of the first arc portions are disposed such that a distance from the first end of the amplifying fiber is shorter than a coherent length.
5. The optical device according to claim 1, wherein the amplifying fiber is a few-mode fiber through which light in a plurality of modes propagates, and the first arc portions are bent such that light in a higher-order mode, that is higher than a predetermined mode, is removed from a core of the amplifying fiber.
6. The optical device according to claim 1, wherein a reflectivity of the first reflector is greater than a reflectivity of the second reflector.
7. The optical device according to claim 1, further comprising:
a first reinforcement that accommodates the first end of the amplifying fiber; and
a second reinforcing portion that accommodates the second end of the amplifying fiber.
8. The optical device according to claim 1, wherein the second end of the amplifying fiber is disposed outside the outer section of the amplifying fiber,
two or more third arc portions are disposed between the outer section and the second end of the amplifying fiber, and
the two or more third arc portions have a radius of curvature set such that the higher-order mode, higher than the LP11 mode, has loss.
9. A fiber laser apparatus comprising:
the optical device according to claim 1;
a plurality of pumping light sources; and
a combiner that couples pumping light emitted from the plurality of pumping light sources to the optical device.
10. The fiber laser apparatus according to claim 9, wherein
the combiner couples the pumping light to at least one of the first fiber or the second fiber of the optical device.

* * * * *